(No Model.) 6 Sheets—Sheet 1.

T. HILL.
STEAM PUMP.

No. 377,938. Patented Feb. 14, 1888.

(No Model.) 6 Sheets—Sheet 2.

T. HILL.
STEAM PUMP.

No. 377,938. Patented Feb. 14, 1888.

Witnesses:
Chas. J. Williamson.
Henry C. Hazard.

Inventor:
Thomas Hill, by
Dindle & Russell, his Attys.

(No Model.) 6 Sheets—Sheet 3.

T. HILL.
STEAM PUMP.

No. 377,938. Patented Feb. 14, 1888.

Witnesses:
Chas. J. Williamson
Henry C. Hazard

Inventor:
Thomas Hill, by
Crindle and Russell, his Att'ys (No Model.) 6 Sheets—Sheet 4.

T. HILL.
STEAM PUMP.

No. 377,938. Patented Feb. 14, 1888.

Witnesses
Chas. J. Williamson.
Henry C. Hazard.

Inventor
Thomas Hill, by
Crindle & Russell, his Attys.

(No Model.) 6 Sheets—Sheet 5.

T. HILL.
STEAM PUMP.

No. 377,938. Patented Feb. 14, 1888.

Witnesses.
Chas. J. Williamson
Henry C. Hazard

Inventor.
Thomas Hill, by
Findley Russell, his Attys (No Model.) 6 Sheets—Sheet 6.

T. HILL.
STEAM PUMP.

No. 377,938. Patented Feb. 14, 1888.

Witnesses:
Chas. J. Williamson
Henry C. Hazard

Inventor
Thomas Hill, by
Prindle and Russell, his Atty's

UNITED STATES PATENT OFFICE.

THOMAS HILL, OF QUINCY, ILLINOIS, ASSIGNOR TO SMITH, HILL & CO., OF SAME PLACE.

STEAM-PUMP.

SPECIFICATION forming part of Letters Patent No. 377,938, dated February 14, 1888.

Application filed October 28, 1886. Serial No. 217,492. (No model.)

*To all whom it may concern:*

Be it known that I, THOMAS HILL, of Quincy, in the county of Adams, and in the State of Illinois, have invented certain new and useful Improvements in Steam-Pumps; and I do hereby declare that the following is a full, clear, and exact description thereof, reference being had to the accompanying drawings, in which—

Figure 1:
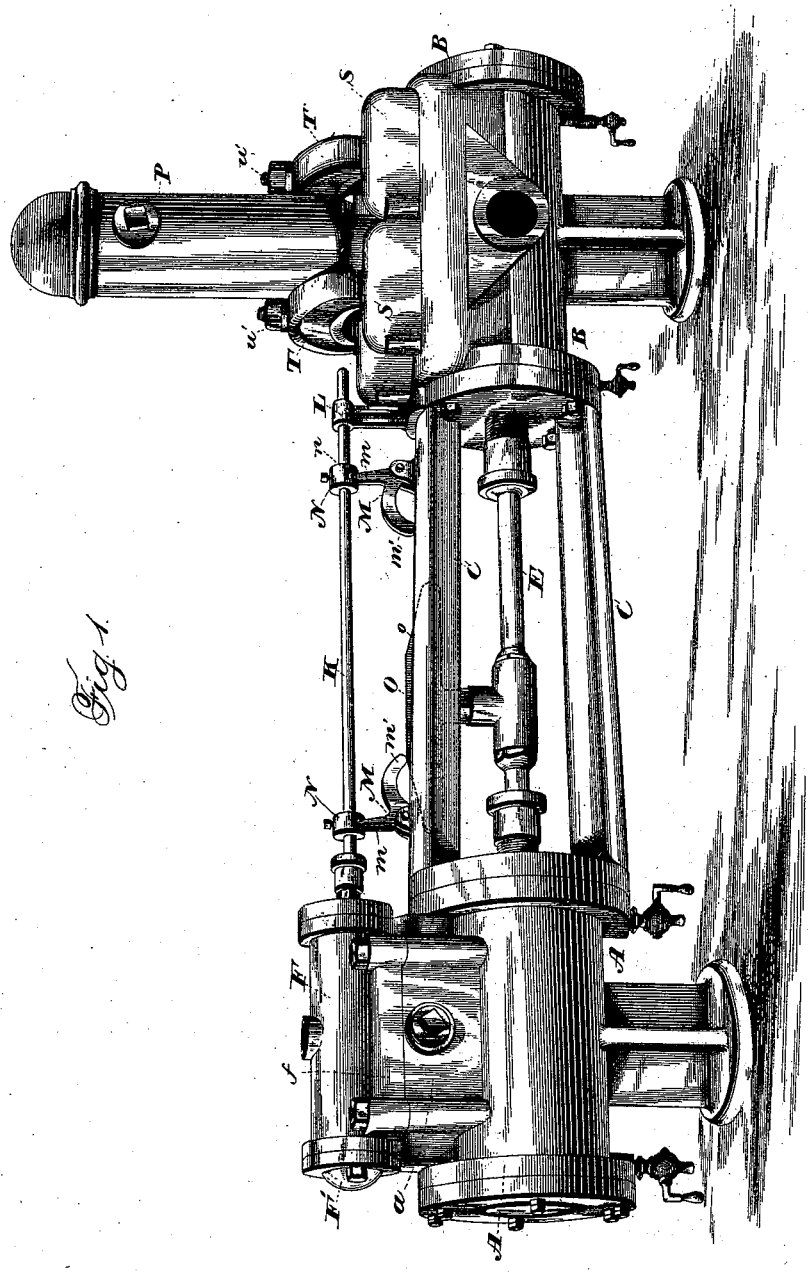
Figure 2:
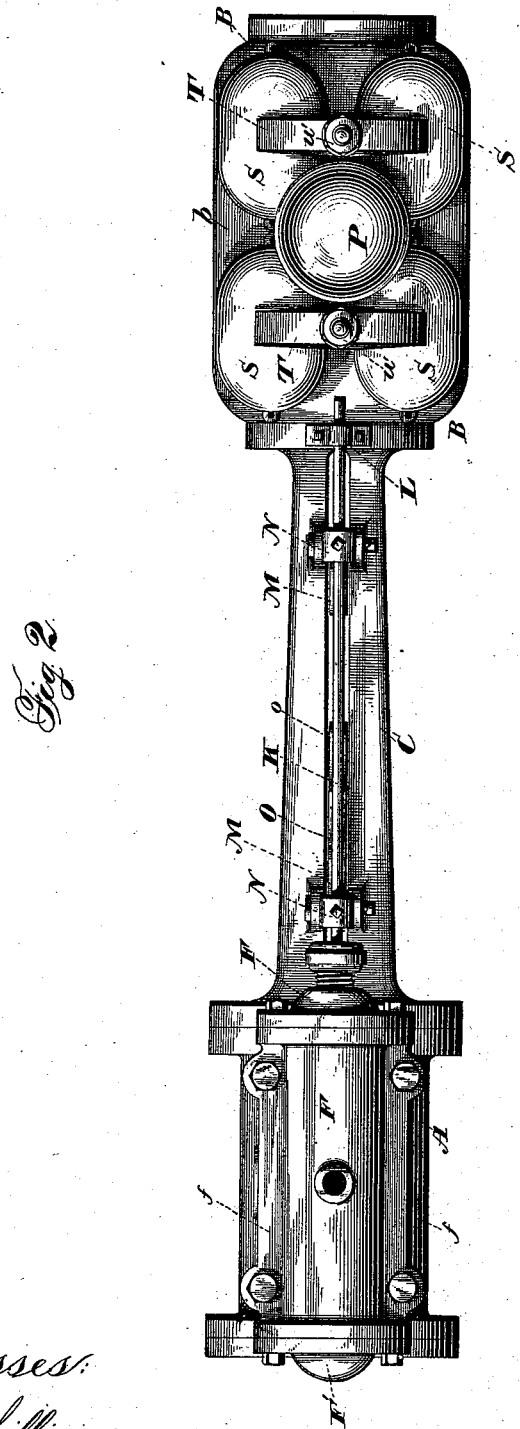
Figure 3:
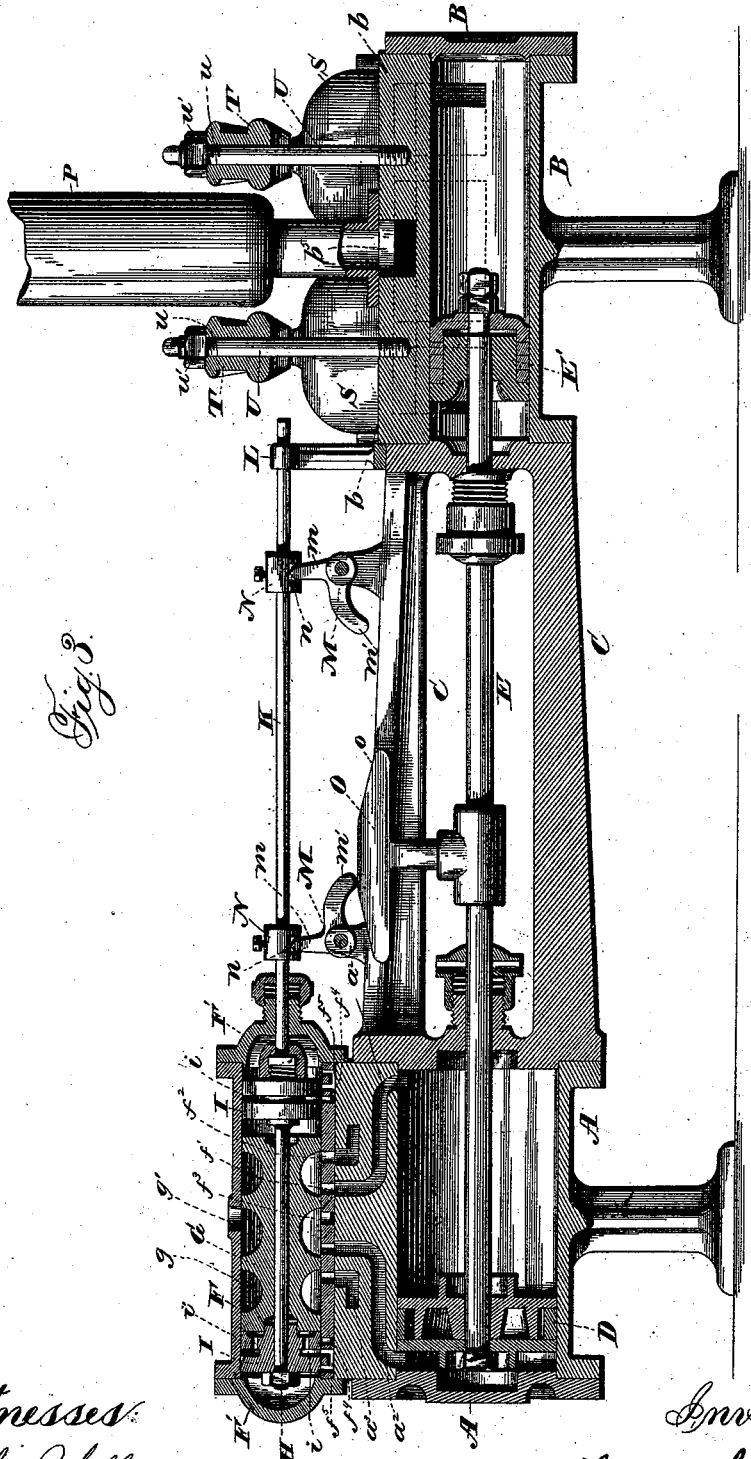
Figure 4:
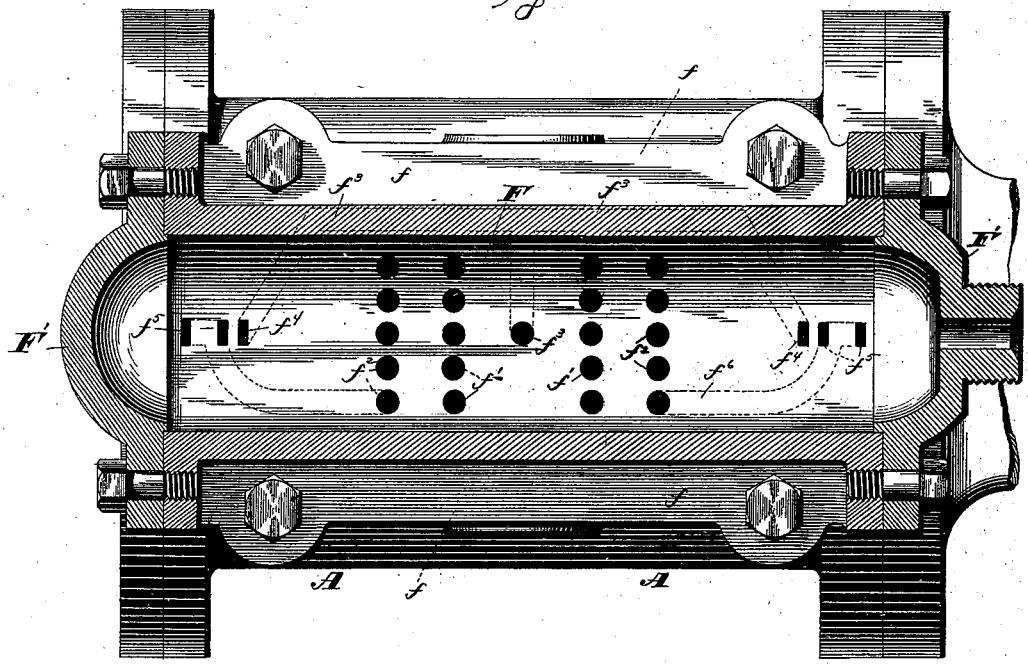
Figure 5:
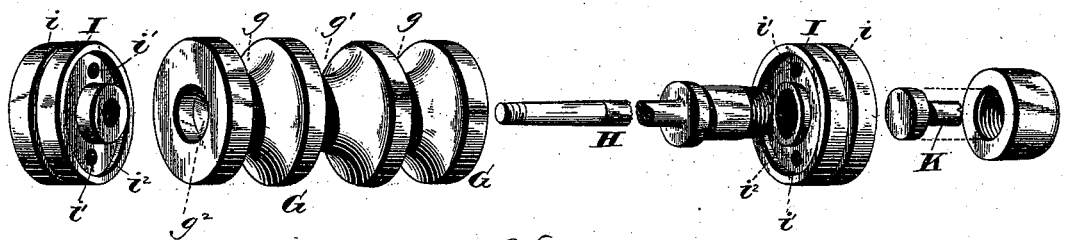
Figure 6:
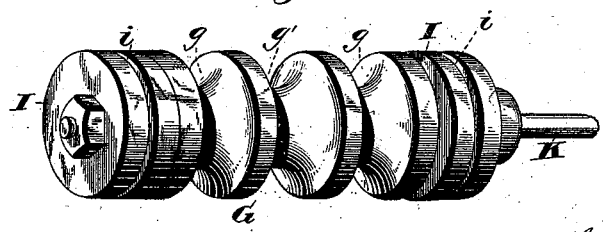
Figure 7:
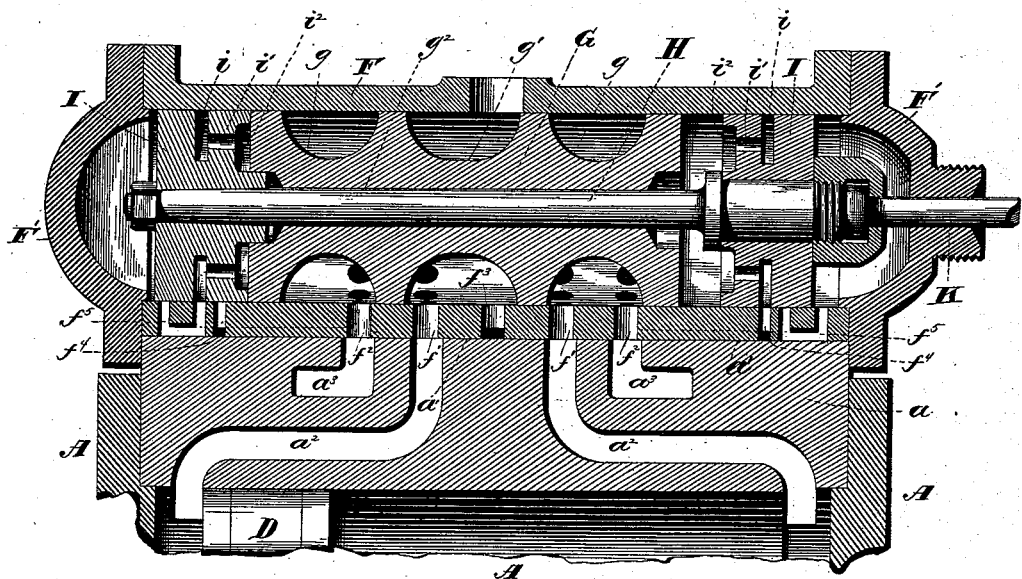
Figure 8:
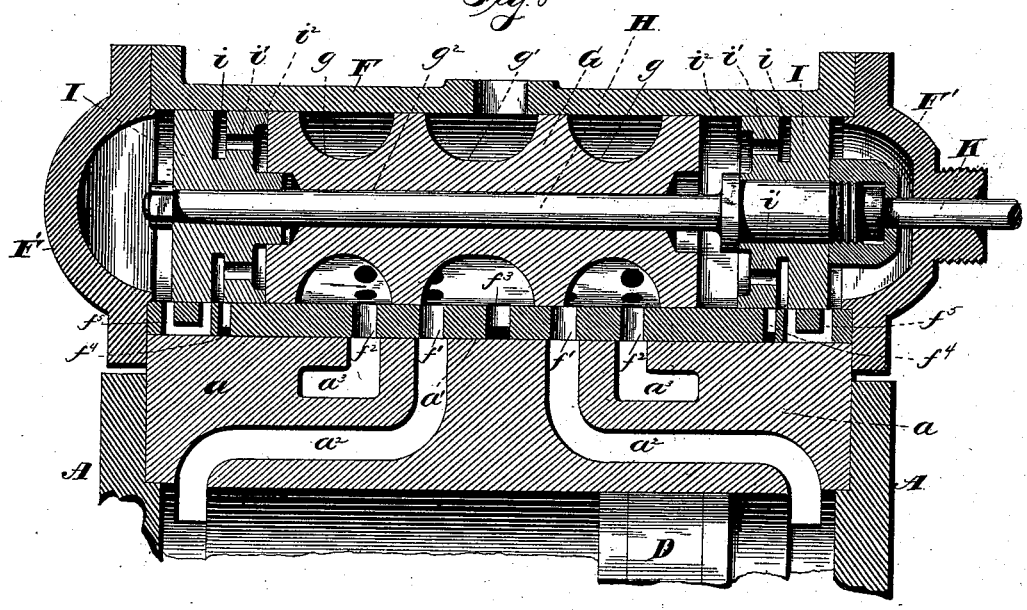
Figure 9:
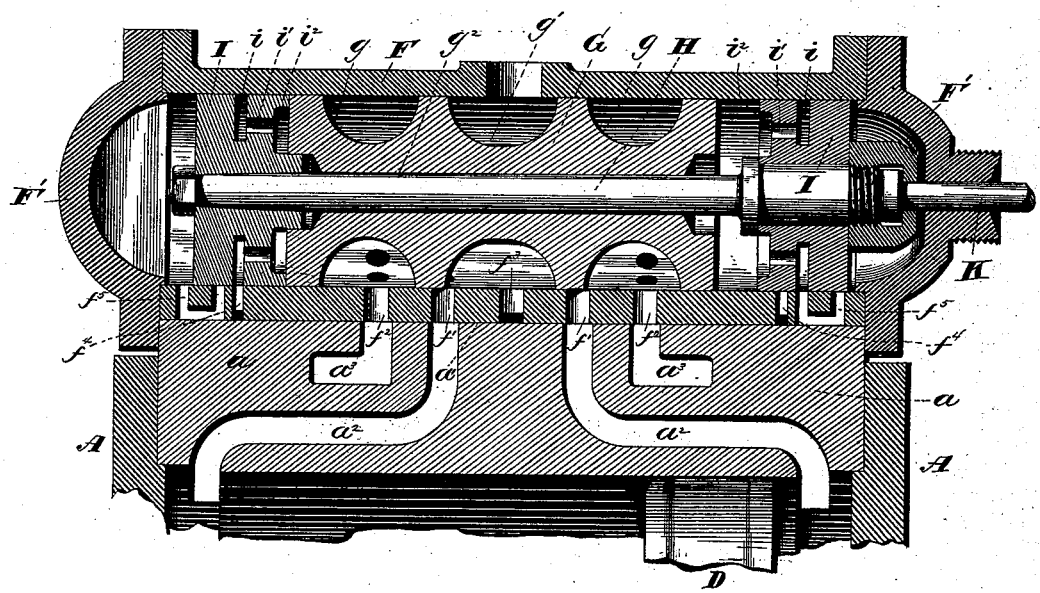
Figure 10:
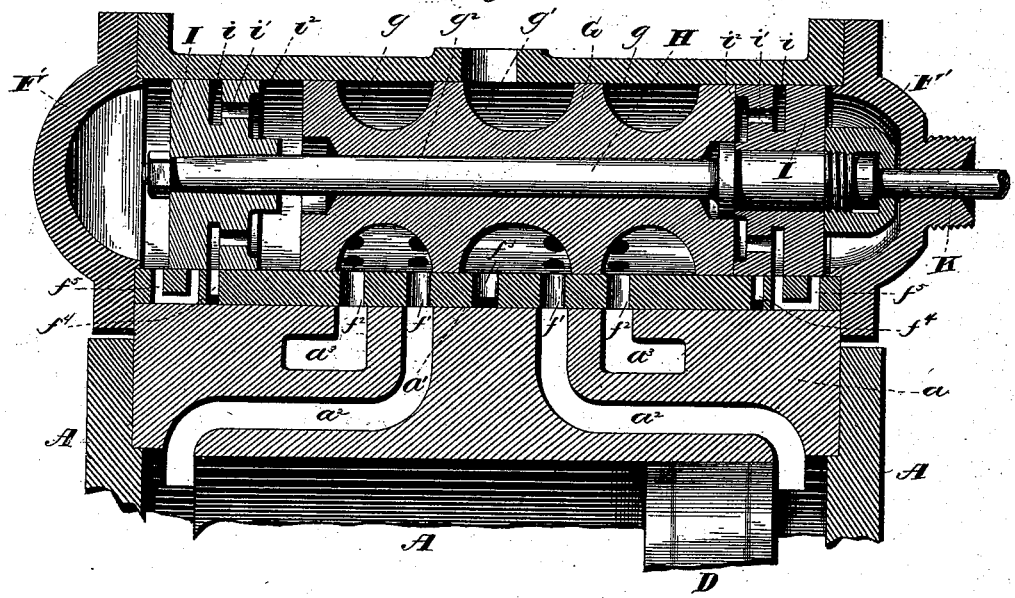

Figure 1 is a perspective view of my improved pump. Fig. 2 is a plan view of the upper side of the same. Fig. 3 is a central longitudinal section of the pump upon a vertical line. Fig. 4 is a plan view of the lower half of the chamber or seat for the steam-valve. Fig. 5 is a perspective view of said valve and its connecting parts separated from each other. Fig. 6 is a like view of the same united. Fig. 7 is an enlarged central longitudinal section of said valve and its chamber, and shows the valve in position at one end of its stroke; and Figs. 8, 9, and 10 are respectively like views of said parts after the valve has been started by the movement of the valve-stem after it has reached position for the action of the steam and after it has been forced by the steam to the limit of its motion in such direction.

Letters of like name and kind refer to like parts in each of the figures.

The design of my invention is to increase the efficiency and ease of operation and management of direct-acting steam-pumps; to which end said invention consists, principally, in the means employed for actuating the main steam-valve, substantially as and for the purpose hereinafter specified.

It consists, further, in the means employed for actuating the supplemental steam-valves, substantially as and for the purpose hereinafter shown.

In the carrying of my invention into practice I employ a steam-cylinder, A, and a water-cylinder, B, which are arranged in the same axial line and are united by means of a skeleton frame, C, that extends between and is secured to the inner ends of said cylinders, and at its ends forms heads for the same, all in the usual manner. Said steam-cylinder contains a piston, D, of usual form, which is connected by means of a rod, E, with an ordinary plunger or piston, F, that is placed within said water-cylinder, all in the usual manner.

Upon the upper side of the steam-cylinder A is an enlargement, $a$, which has a plane upper face, $a'$, that corresponds to an ordinary valve-seat, from which, near its longitudinal center, two passages, $a^2$, pass downward, outward and then downward into the ends of said cylinder, and perform the usual office of side ports. Between the upper end of each side port, $a^2$, and the contiguous end of said seat $a'$ is provided another port, $a^3$, that from thence extends downward and then laterally outward to one or both sides of the cylinder, where it unites with the opposite port $a^3$, and in connection therewith furnishes an exit for exhaust-steam.

Secured upon the seat $a'$ is a cylindrical valve-casing, F, which corresponds therewith in length and is provided at its lower side with a base, $f$, that has a plane lower face and furnishes means whereby the casing is fastened upon said seat. Interiorly said casing has a round straight form and at each of its ends is inclosed by means of a cup-shaped head, F'. At points directly over each of the ports $a^2$ or $a^3$ a number of openings, $f'$ or $f^2$, respectively, pass from the interior of the casing F downward through its base $f$ and furnish communication between said interior and said ports. At the longitudinal center of said casing is provided another opening or port, $f^3$, which passes downward a short distance, thence horizontally outward beyond the ends of said ports $a^2$ and $a^3$, and from thence lengthwise of said casing nearly to each end, and from thence inward to the transverse center of the same, where it terminates in a port, $f^4$, that opens upward into the interior, as shown.

Between each port $f^4$ and the contiguous end of the casing F are two similar ports, $f^5$, that at their lower ends are connected together and with one of the ports $f^2$ by means of a passage, $f^6$, which is shown by dotted lines in Fig. 4. Said ports $f^5$ are separated from each other and from said port $f^4$ by certain predetermined distances, and, together with the central port, $f^3$, are arranged upon a line which passes lengthwise through the lower side of said casing.

Fitted within the casing F is a cylindrical valve, G, which is adapted to slide freely within said port, and is provided at equidistant points within its periphery with three half-round circumferential grooves, $g$ and $g'$. Said valve has a round axial opening, $g^2$, which contains a correspondingly-shaped rod, H, that is provided upon each end with a cylindrical block, I. Each of said blocks has at its longitudinal center a circumferential groove or channel, $i$, which extends from its periphery about one-half way to its center, and from which two or more openings, $i'$, extend through the inner end of said block into a recess, $i^2$, that is formed within such end. Said valve does not fill the space longitudinally between said blocks or supplemental valves, and is adapted to move freely between the same upon said rod. To the outer end of the front valve I is secured one end of a valve-rod, K, which from thence extends outward through a suitable stuffing-box upon the head $F'$ and has its opposite end contained within and supported by a guide, L, that extends upward from the opposite end of the main frame C. Pivoted upon said frame near each end is an L-shaped lever, M, which has one of its arms, $m$, placed upright and its upper end contained within a recess, $n$, that is formed in a collar, N, upon said valve-rod K.

The lower arms, $m'$, of the levers M extend inward and downward, and are engaged by a T-shaped arm, O, which projects upward from the piston-rod E. The head of said arm O is provided with two bearing-faces, $o$, that extend from each end upward and inward nearly to its longitudinal center, and as said piston-rod moves to and fro pass beneath and alternately raise the outer ends of the lower arms, $m'$, of said levers M, and by such operation give to the valve-rod K the necessary longitudinal reciprocating motion.

The main steam-valve has the usual construction and performs its office in the usual manner, its steam-grooves having such size and arrangement with relation to the inlet and exhaust ports as to secure any predetermined amount of lead and lap. The supplemental valves have also certain proportions with relation to the supplemental ports over which they travel, as will be seen by the following description of their operation.

In Fig. 7 is shown the position of parts when the piston is leaving the outer end of the cylinder, steam having just been admitted to its rear. As the piston nears the opposite end of its stroke, the inclined arm O engages with the contiguous lever M and moves the valve-rod and valves in the same direction until said parts reach the position seen in Fig. 9, when the groove $i$ of the rear valve I coincides with the steam-port $f^4$, and steam is admitted through the openings $i'$ into the recess $i^2$, where it acts upon the contiguous end of the main valve G and moves the same quickly forward into engagement with the opposite supplemental valve I, and by its momentum carries the latter with the opposite valve I and the valve-stem to the limit of their motion in such direction, by which operations steam is admitted to the cylinder in front of the piston and exhausted from the same in rear of said piston. At the instant when one of the supplemental valves admits steam to the space between its end and the end of the main valve the groove $i$ of the opposite supplemental valve connects with the exhaust-port $f^5$ and permits such steam as is between the former and said main valve to escape.

The supplemental exhaust-ports $f^5$ are located near but not at the ends of the valve-chamber, and after one of the supplemental valves I has passed outward beyond said port the steam contained in the end of said chamber operates as a cushion and arrests the motion of the moving parts without shock.

It will be seen that while the movements of the main valve are initiated by the steam-piston, acting through the piston-rod, tripping-lug, tripping-levers, and valve-rod, the principal movements of said valve are caused by the direct action of the steam, and are unvarying and entirely independent of the speed of said piston or the distance to which it moves within its cylinder, while from the form of the tripping mechanism the piston, after having given the initiatory movement to said valve, is free to move in such direction until checked by the admission of steam into its cylinder without interference with or reference to the steam-controlling mechanism.

Upon the upper side of the water-cylinder B is formed a plane face, $b$, within which, at each side, transversely of its longitudinal axis are formed four water-ports, $b'$ and $b^2$, or $b^3$ and $b^4$. The ports $b'$ and $b'$ are preferably semicircular in plan view at the upper ends, with their curved sides toward the ends of the cylinder, and each communicates directly with the interior of said cylinder at a point at or near the corresponding end, while the ports $b^2$ and $b^2$ are round in plan view, at their upper ends are arranged in a line between said ports $b'$, and beneath the face $b$ are connected together and terminate in an opening at one side of the cylinder.

The ports $b^3$ and $b^4$ correspond, respectively, in size and shape to the like features of the ports $b'$ and $b^2$, but are reversed in their arrangement, the round ports being outside and the semicircular ports inside of or between the same. Said round ports $b^3$ communicate with the ends of the interior of the cylinder B, and said ports $b^4$ unite and open laterally outward at the sides of said cylinder. They also communicate with a centrally-located opening, $b^5$, which is adapted to receive the lower end of an air-chamber, P.

Each of the round ports $b'$ or $b^3$ is intended for a valve, Q or R, and is preferably provided with a separately formed and attached annular seat, $q$ or $r$, and over each pair of ports is placed a housing, S, which has a dome-shaped top and is held in place upon the face by means of a yoke, T, that extends transversely across the cylinder with its ends resting upon two of said housings, and at its center receives a bolt, U, which extends upward from said face and is provided upon its upper threaded end, $u$, with a nut, $u'$, the arrangement being such that by turning downward upon said nut said yoke will be forced downward and said housings held down upon said face $b$ with any desired amount of pressure.

In order that the housings S may be held in lateral position and prevented from displacement therefrom when being removed or replaced, there are preferably provided two or more dowel-pins, $s$, which are secured within one of the abutting faces and engage with corresponding openings in the contiguous face. To insure a perfect and equal bearing of the yoke T upon said housings, the engaging ends of the former are each provided with a semispherical boss, $t$, which fits into a corresponding socket, $s'$, that is provided in the upper side of each housing, in consequence of which construction said yoke is left free to conform to differences in height or position of said housings and has an equal bearing upon each.

Each valve Q or R is provided upon its upper side with the usual stem, $q'$ or $r'$, and for the reception and guidance of the same there is formed within each housing S, directly above its valve, a cylindrical boss, $s^2$, which is provided with a vertical opening, $s^3$, that corresponds to and is adapted to receive the stem of said valve.

In the operation of the pump water is drawn into the cylinder B through the ports $b^2$ and $b'$ and is expelled from said cylinder through the ports $b^4$ and $b^3$, the valves Q being raised by suction and closed by pressure, while the valves R are raised by pressure and closed by suction, the water being alternately taken into and discharged from each end of said cylinder in the usual manner.

It will be seen that each suction and discharge valve has its own housing and is entirely distinct and separate from the other valves, and that in order to obtain access to either of said valves and its ports it is only necessary to remove its housing. It will also be seen that the means employed for securing the housings in place, while thoroughly efficient, is of the most simple character, one bolt operating to confine two of said housings in position upon their bearing-face.

Having thus described my invention, what I claim is—

1. In a direct-acting steam-engine, a main steam-valve which is primarily moved by the impingement of a supplemental steam-valve and receives its principal final motion from steam that is controlled by said supplemental valve, substantially as and for the purpose specified.

2. In a direct-acting steam-engine, a main steam-valve which has its movement initiated by the direct impingement of a supplemental steam-valve, and such movement then continued and completed by the operation of steam that is controlled by said supplemental valve, substantially as and for the purpose shown.

3. In a direct-acting steam-engine, a main steam-valve which, through suitable intermediate mechanism, receives positive initiatory movement from the piston, and such movement is then continued and completed by the direct action of steam, substantially as and for the purpose set forth.

4. In a direct-acting steam-engine, mechanism, substantially as described, for controlling the admission of steam to and its escape from the cylinder, which is in part actuated positively by the movements of the piston and in part by the direct action of steam, substantially as and for the purpose specified.

5. In a direct-acting steam-engine, mechanism, substantially as described, for controlling the passage of steam to and its escape from the cylinder, which has its movements initiated by the indirect action of steam through positively-actuating mechanism, and such movements continued and completed by the direct action of the same, substantially as and for the purpose shown.

6. In a direct-acting steam-engine, a piston-valve which by movements lengthwise of its casing is adapted to control the passage of steam to and its escape from the cylinder, in combination with two positively-moved supplemental valves that are located at opposite ends of the main valve and are each adapted to impinge upon and move the same through a part of its stroke and to admit steam to its rear, whereby, by the direct action of the former, said main valve will be moved to the end of its stroke in such direction, substantially as and for the purpose set forth.

7. In a direct-acting steam-engine, in combination with a steam-valve which operates to control the admission of steam to and its escape from the cylinder, two supplemental valves that are each adapted to positively move said main valve through a portion of its stroke and to cause such movement to be continued and completed by admitting steam directly against its rear, substantially as and for the purpose shown and described.

8. In a direct-acting steam-engine, a valve-rod which is positively moved longitudinally in opposite directions by the movements of the piston, two supplemental piston-valves that are secured to and move with said valve-rod, and a main valve which is placed upon and adapted to slide over the latter between said supplemental valves, in combination with each other and with a valve-casing that is provided with suitable ports, whereby the forward movement of each of said supplemental valves will first cause said main valve to be given a positive forward movement, and such movement then continued and completed by the admission of steam to its rear, substantially as and for the purpose specified.

9. In a direct-acting steam-engine, as a means for reciprocating the valve-rod longitudinally, two L-shaped pivoted levers, each of which has one of its arms pivoted to or connected with said rod, in combination with an arm that is secured upon the piston-rod and adapted to move beneath and engage alternately with the free arms of said levers and is provided with an engaging-face that centrally is parallel with said valve-rod, and from such central portion to its ends has relatively opposite inclinations, substantially as and for the purpose shown.

In testimony that I claim the foregoing I have hereunto set my hand this 22d day of October, A. D. 1886.

THOMAS HILL.

Witnesses:
F. M. McCANN,
CHAS. H. BAGBY.